March 3, 1970        E. SCHNABEL        3,498,319

VALVE, PARTICULARLY LINED WITH PLASTIC MATERIAL

Filed July 3, 1968        3 Sheets-Sheet 1

INVENTOR.

Ernst Schnabel

United States Patent Office 3,498,319
Patented Mar. 3, 1970

3,498,319
VALVE, PARTICULARLY LINED WITH PLASTIC MATERIAL
Ernst Schnabel, 354 Postfach, 2650 Limburg (Lahn), Germany
Filed July 3, 1968, Ser. No. 742,220
Claims priority, application Germany, Aug. 23, 1967, Sch 41,197
Int. Cl. F16k 25/04, 31/44, 41/00
U.S. Cl. 137—375                                  8 Claims

ABSTRACT OF THE DISCLOSURE

Valve for installation in a pipe line includes a pair of different-diameter pipe lengths coaxially and serially disposed in a flow direction and defining a chamber. A valve seat formed with a flow opening disposed in the chamber and having a seating surface extending between and transversely to the axis of the pipe lengths. A valve member located within the pipe length of larger diameter is movable in the flow direction normally to the seating surface, the valve member having a diameter smaller than that of the larger-diameter pipe length so as to form an annular flow passage at the periphery thereof, and actuating means for moving the valve member extending out of the valve chamber and including a flexible member operatively connected at one end to the valve member and having a bend therein so that a portion thereof extends transversely to the flow direction.

My invention relates to a valve for installation in pipe lines and more particularly to such a valve lined with plastic or synthetic material.

It is an object of my invention to provide a valve that is assembled in a space-saving manner of simple and, if necessary, easily replaceable elements, the elements being of such shape as to facilitate the lining thereof.

With the foregoing and other objects in view, I provide according to the invention, a valve for installation in pipe lines and more particularly lined with plastic material, which has a valve seat defining a flow opening and disposed in a valve chamber, and a valve member which is movable normally to the valve seat by means of an actuating element. The valve chamber is formed by two pieces of piping of different diameters disposed coaxially and in series in the direction of flow and the valve seat is formed by a radial surface between the two pieces of piping. The valve member is located within the piece of piping of larger diameter, leaving a flow cross-section free in the peripheral zone, and is movable in the direction of flow. The actuating element extends out of the valve chamber, and a flexible actuating member bent transversely to the direction of flow is operatively connected with the actuating element.

According to other features of my invention, the valve housing consists of two lengths of piping and therefore does not need to be cast and can be provided with a lining if necessary in a particularly simple manner. The valve member is always located in the length of piping having the larger diameter of the two lengths so that it is unnecessary to provide an extension or the like for receiving the valve member in the open condition of the valve. The valve member is of such dimension and the internal diameter of the length of piping accommodating the valve member is of such size that a relatively large flow cross-section in the open position of the valve member is afforded by an annular passage at the periphery of the member, and the pressure loss produced by the valve member is slight. The valve member may be pulled or pushed against its seat by the actuating element. The actuating element projecting out of the valve chamber laterally through one of the two lengths of piping may be operated in any desired manner, for example mechanically, electrically or pneumatically. Thus, the actuating element can be pushed into the valve chamber or drawn out of it and the flexible actuating member produces a change of direction of the applied movement in such manner that the valve member is shifted in the direction of flow and normally to the valve seat. Only a relatively small increase in the internal diameter of the two lengths of piping in relation to the pipe-line diameter of the pipe-line in which they are installed, is necessary to obtain a suitably large free flow cross-section in the valve. As there are no bent portions in the housing formed by the two lengths of piping, the valve according to the invention is of small dimensions and can therefore be inserted in a straight pipe line at locations having limited overhead clearance.

According to other features of the invention, in a valve structure wherein the actuating element protrudes out of the length of piping of smaller diameter, a valve seat having a radially extending surface and facing the valve member is also provided at the outer end of the length of piping of larger diameter and the valve member is movable substantially the entire distance along the length of piping of larger diameter to bear against both valve seats. In this case, the valve member is either pulled against one valve seat or pushed against the other valve seat when the valve is to be closed. The valve member is located preferably in the middle between the two valve seats when in the open position. Thus, two possibilities of closing the valve with different sealing surfaces are provided, so that if one sealing surface is damaged by solid materials contained in the medium flowing through the valve, such as nails or the like, which could cause a leak in the valve, the valve can be fully effective in the other closed position thereof.

In the drawings

Figure 1:
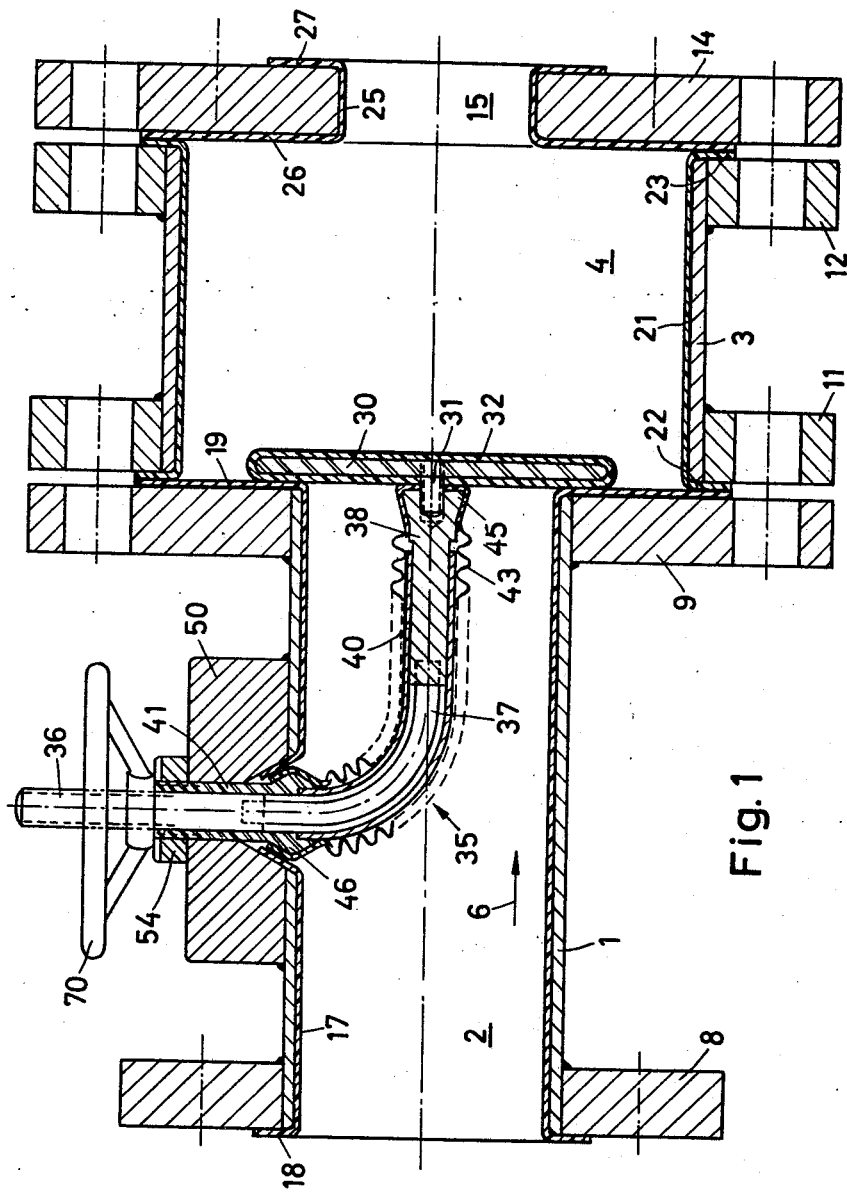
FIG. 1 is a longitudinal sectional view of a valve provided with a lining of plastic material according to the invention.

According to FIG. 1, the valve includes a first piece of piping 1 which encloses a cylindrical chamber 2 and a second piece of piping 3 of larger diameter which encloses a cylindrical chamber 4. The two pieces of piping 1 and 3 are arranged coaxially and, as shown by the arrow 6 indicating the direction of fluid flow through the valve, the piece of piping 3 is arranged behind the piece of piping 1 in the direction of flow. The piece of piping 1 is welded at its ends to radially outwardly projecting, connecting flanges 8, 9. Similar radially outwardly projecting connecting flanges 11, 12 are provided at the ends of the piece of piping 3. A connecting flange 14 is associated with the outer connecting flange 12 of the piece of piping 3 and is equal in diameter thereto. The connecting flange 14, however, extends further radially inwardly than the flange 12 and defines an outlet orifice 15 having a diameter somewhat smaller than the internal diameter of the piece of piping 1 and corresponding to the diameter of a pipe line in which the valve is to be installed.

A sleeve 17 of polytetrafluoroethylene is inserted in the piece of piping 1, the ends of the sleeve 17 being flanged over around the ends of the piece or length of piping 1 until they bear against the outwardly directed end faces of the connecting flanges 8 and 9, respectively, and form radially outwardly extending flanged rims 18, 19. The length of piping 3 is lined in a corresponding manner with a sleeve 21 of polytetrafluoroethylene having flanged rims 22, 23. The connecting flange 14 is similarly provided with a lining 25 which has rim portions 26, 27 extending radially outwards and bearing against the two end faces of the connecting flange 14. The flanges 9, 11, 12 and 14 are clamped together by non-illustrated screw bolts extending through suitably registered bores so that the flanged rims 19, 22, 23 and 26, respectively, are sealingly pressed, one against the other.

The valve member 30 is in the form of a flat metal disc arranged coaxially in the cylindrical chamber 4, the disc having a threaded fixing pin 31 and being enclosed by a sheath 32 of plastic material.

Figure 3:
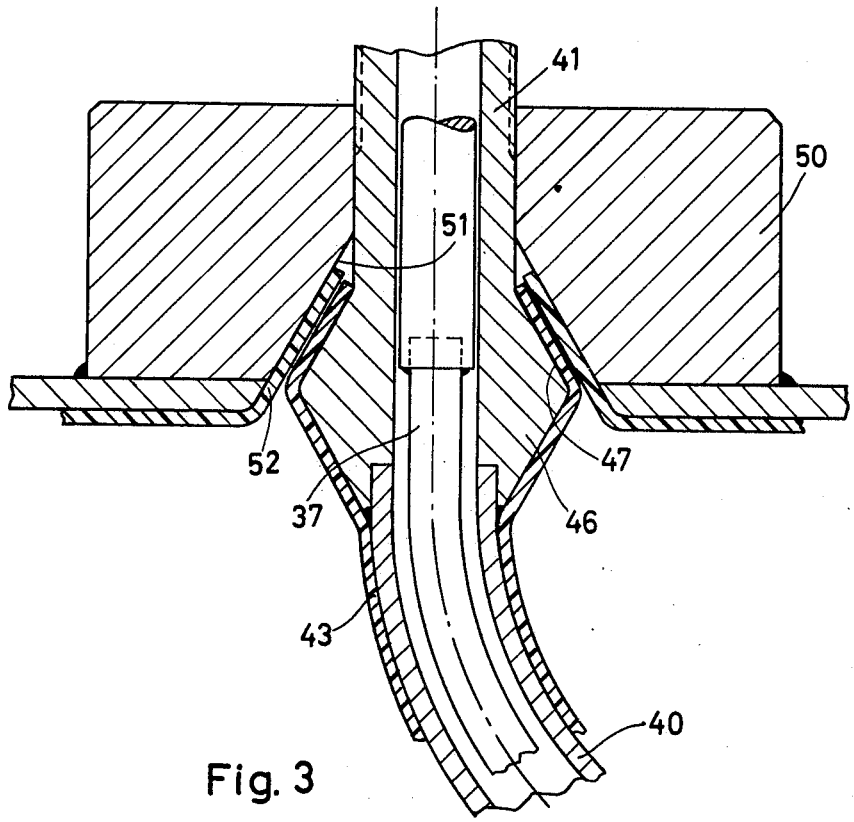
FIG. 3 is an enlarged longitudinal sectional view of another part of the valve shown in FIG. 1.

The actuating element 35 for the valve member 30 is made up of a rigid actuating member 36 extending radially outside the length of piping 1, a flexible actuating member 37 having a 90° bend, and a rigid actuating member 38 extending in axial direction within the length of piping 1 and screwed to the valve member 30 by the threaded fixing pin 31. The ends of the flexible actuating member 37 are fixedly connected respectively to an end of the actuating part 36 and of the actuating part 38. The flexible actuating member 37 is guided in a guide tube 40 bent through 90° and held stationary by a holding member 41 which extends radially out of the cylindrical chamber 2. The axially extending inner end of the guide tube 40 accommodates that end of the rigid actuating member 38 which is remote from the valve member 30 so that the last-mentioned end can be moved by sliding therein. A bellows 43 of plastic material is supported on the guide tube 40 so that it can move thereon by sliding. The inner end of the bellows 43 is flanged inwardly over a radially outwardly projecting rim 45 provided on the actuating member 38 and is clamped, together with the plastic sheath 32 of the valve member 30, between the actuating member 38 and the valve member 30, so that parts of the bellows 43 and the sheath 32, both of plastic material, are pressed one against the other a with a sealing action. The bellows 43 has an outer end that is flanged over a projecting rim 46 provided on the inner end of the holding member 41 and has, as shown in FIG. 3, a surface 47 tapering conically outwards.

At the location at which the actuating element 35 extends out of the piece of piping 1, a reinforcing block 50 is welded to the outside of the piece of piping 1, the reinforcing block having a central bore through which the holding member 41 projects. The bore of the reinforcing block 50 has a length adjacent the piece of piping 1 that widens in conical form into the cylindrical chamber 2 enclosed by the piece of piping 1 and is defined by a conical surface 51 disposed parallel to the conical surface 47. The lining sleeve 17 of the piece of piping 1 is flanged over into the conical opening of the bore of the reinforcing block 50 and bears against the conical surface 51, and the flanged rim 52, formed of the sleeve 17, is clamped sealingly together with the flanged outer end of the bellows 43, between the conical surfaces 47 and 51 by turning the nut 54 and thereby displacing the movable holding member 41 radially outwardly relative to the piece of piping 1 and against the reinforcing block 50.

Figure 2:
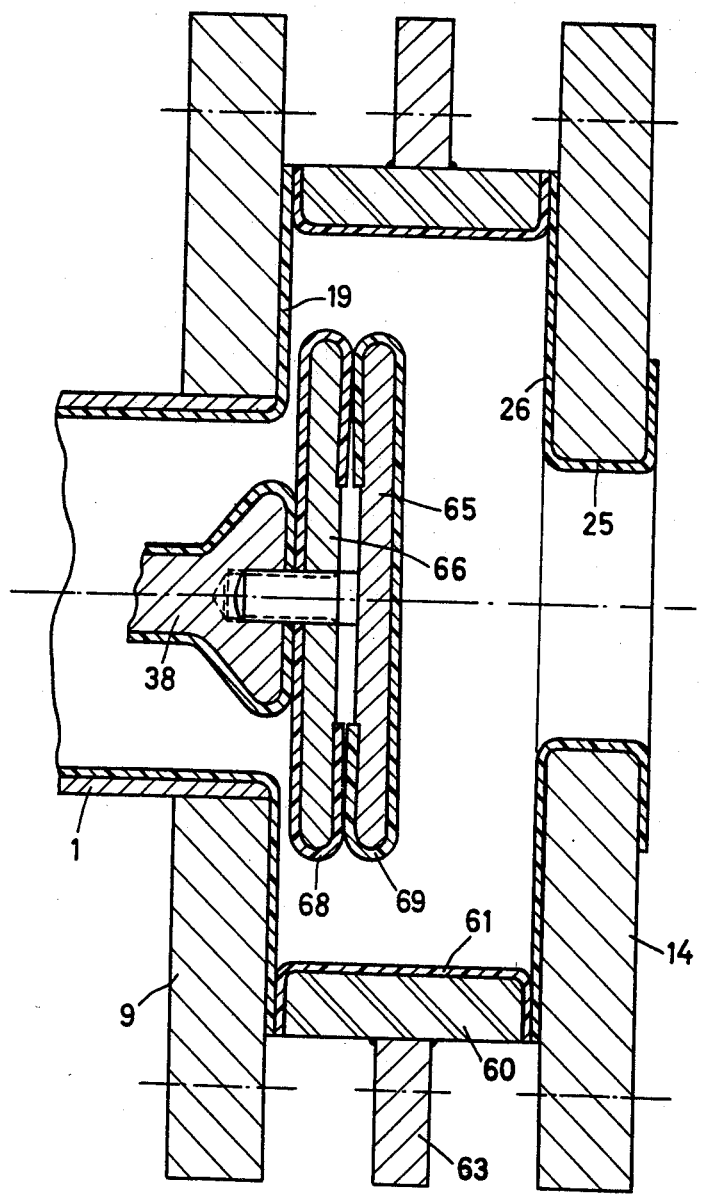
FIG. 2 is an enlarged longitudinal sectional view of part of the valve of FIG. 1, modified by having two valve seats co-operating with a modified valve member.

Instead of the piece of piping 3 shown in FIG. 1 there is provided in the modified valve of FIG. 2 a shorter piece of piping 60 in which a short lining sleeve 61 of plastic material is inserted. A single central flange 63 is provided in FIG. 2 instead of the two end flanges 11, 12 of the piece of piping 3, shown in FIG. 1. The flanges 9 and 14 are also drawn together in the embodiment of FIG. 2 by means of screw bolts (not shown). The piece of piping 60 and the lining sleeve 61 are clamped between the flanges 9 and 14, and the flange 63 through which the screw bolts extend serves to center the piece of piping 60, so that it is disposed coaxial with the piece of piping 1. The valve member in FIG. 2 is formed by two flat valve discs 65, 66 that are separately covered by two sheaths 68, 69 of plastic material. The sheaths 68, 69 are tightly clamped between the valve discs 65, 66 by tightly screwing the valve disc 65 to the rigid actuating member 38, so that a medium flowing through the valve cannot pass between the sheathed valve discs 65, 66 and come into contact with them. In all other respects, the construction of the valve shown in FIG. 2 corresponds to the construction shown in FIG. 1.

As seen in FIG. 1, a handwheel 70 is provided for operating the valve, the handwheel being screwed by a threaded hub onto a corresponding thread provided on the outer end of the rigid actuating member 36. The handwheel 70 is held stationary with respect to the reinforcing block 50, so that when the handwheel 70 is turned, the rigid actuating member 36 is displaced to a greater or lesser depth into the cylindrical chamber 2 and into the holding member 41. The displacement of the rigid actuating member 36 is transmitted by the flexible actuating member 37 and the rigid actuating member 38 to the valve member 30 (FIG. 1) or 65, 66 (FIG. 2) so that the flexible actuating member 37 is shifted to the right or left in the direction of the axis of the piece of piping 3 or 60, respectively. In the process, the bellows 43 is expanded or compressed accordingly.

FIG. 1 shows the valve member 30 in the left-hand end position, in which the valve is closed. In this closed position, the valve member 30 and the peripheral zone of the sheath 32 of synthetic material are drawn against the flanged rim 19 of the sleeve 17 of synthetic material, so that no fluid medium can pass out of the cylindrical chamber 2 into the cylindrical chamber 4.

I claim:

1. Valve for installation in a pipe line comprising a pair of pipe lengths of different diameters coaxially and serially disposed in a given flow direction and defining a valve chamber therewithin, the pipe length of larger diameter being open only at the axially outer and inner ends thereof, said pipe lengths being formed with end flanges, and including means clamping said flanges together, lining sleeves of plastic material received in said pipe lengths respectively, said lining sleeves having respective flanged rims clamped between said end flanges of said pipe lengths, a first valve seat formed with a flow opening disposed in said valve chamber and having a seating surface extending between and transversely to the axis of said pipe lengths, said first valve seat being located at the inner end of the pipe length of larger diameter, a second valve seat facing said first valve seat and having a seating surface extending transversely to said axis of said pipe lengths at the outer end of the pipe length of larger diameter, a valve member located within the pipe length having the greater diameter of said pair of lengths and being movable over substantially the entire length of said pipe length of larger diameter in said flow direction normally to said seating surfaces for selectively bearing against both said valve seats, said valve member having a diameter smaller than the diameter of the pipe length within which it is located so as to form an annular flow passage at the periphery thereof, actuating means for moving said valve member, said actuating means extending out of said valve chamber and including a member operatively connected at one end to said valve member and having a bend therein so that a portion thereof extends transversely to the flow direction, and sealing bellows of corrosion-resistant plastic material disposed in said valve chamber and enclosing said actuating means therein.

2. Valve according to claim 1, including a bent tube stationarily mounted in said valve chamber, said member of said actuating means being flexible and guidingly movable in said bent tube.

3. Valve according to claim 2, wherein said bent tube has an inner end extending in said direction of flow, said actuating means including a rigid actuating member interposed between said flexible member and said valve member and guided in said inner end of said bent tube.

4. Valve according to claim 1, wherein said plastic material is polytetrafluoroethylene.

5. Valve according to claim 1, including flanges mounted at the remote free ends of said pipe lengths, said lining sleeves having flanges also located at said remote flanges of said pipe lengths.

6. Valve according to claim 1, wherein said bellows have a radially inwardly disposed flange at the inner end thereof, and a sheath of plastic material covering said valve member, said inner flange of said bellows and said sheath being clamped between said valve member and said actuating means connected thereto.

7. Valve for installation in a pipe line comprising a pair of pipe lengths of different diameters coaxially and serially disposed in a given flow direction and defining a valve chamber therewithin, the pipe length of larger diameter being open only at the axially outer and inner ends thereof, said pipe lengths being formed with end flanges, and including means clamping said flanges together, lining sleeves of plastic material received in said pipe lengths respectively, said lining sleeves having respective flanged rims clamped between said end flanges of said pipe lengths, a valve seat formed with a flow opening disposed in said valve chamber and having a seating surface extending between and transversely to the axis of said pipe lengths, a valve member located within the pipe length having the greater diameter of said pair of lengths and being movable in said flow direction normally to said seating surface, said valve member having a diameter smaller than the diameter of the pipe length within which it is located so as to form an annular flow passage at the periphery thereof, actuating means for moving said valve member, said actuating means extending out of said valve chamber and including a member operatively connected at one end to said valve member and having a bend therein so that a portion thereof extends transversely to the flow direction, and a sealing bellows of plastic material disposed in said valve chamber and enclosing said actuating means therein, said bellows having an inwardly extending flange at the outer end thereof, said actuating means extending out of said valve chamber through a conically tapering opening formed in one of said pipe lengths, the respective lining sleeve received in said one pipe length having a flange rim extending into said opening, and further including a tubular holding member having a conical surface corresponding to said opening, said flange of said bellows surmounting said conical surface of said holding member, said holding member being clamped to said one pipe length, and said flange rim of said one pipe length and said flange at said outer end of said bellows being clamped between the conical surface of said holding member and the conical surface defining said opening.

8. Valve according to claim 7, wherein said inner and outer ends of said bellows are flanged over projecting rims formed at opposite ends of said actuating means and on said holding member, respectively.

References Cited

UNITED STATES PATENTS

| | | | |
|---|---|---|---|
| 1,923,306 | 8/1933 | Hagen | 137—375 XR |
| 2,743,738 | 5/1956 | Johnson | 251—335 XR |
| 3,073,336 | 1/1963 | Johnson | 137—375 |
| 3,326,239 | 6/1967 | Saint-Joanis et al. | 137—625.27 XR |

FOREIGN PATENTS 695,843  9/1940  Germany.

HENRY T. KLINKSIEK, Primary Examiner

U.S. Cl. X.R.

251—294, 335